United States Patent
Batzinger et al.

(10) Patent No.: US 7,877,888 B2
(45) Date of Patent: Feb. 1, 2011

(54) SYSTEM AND METHOD FOR MEASURING INSTALLATION DIMENSIONS FOR FLOW MEASUREMENT SYSTEM

(75) Inventors: Thomas James Batzinger, Burnt Hills, NY (US); Jeffrey David Tilden, Norton, MA (US); Xiaolei Shirley Ao, Lexington, MA (US); Waseem Ibrahim Faidi, Schenectady, NY (US); Yanyan Wu, Schenectady, NY (US); Nelson Raymond Corby, Jr., Scotia, NY (US)

(73) Assignee: General Electric Company, Niskayuna, NY (US)

( * ) Notice: Subject to any disclaimer, the term of this patent is extended or adjusted under 35 U.S.C. 154(b) by 238 days.

(21) Appl. No.: 11/923,881

(22) Filed: Oct. 25, 2007

(65) Prior Publication Data

US 2009/0112509 A1 Apr. 30, 2009

(51) Int. Cl.
G01B 21/28 (2006.01)
G01B 5/213 (2006.01)
G01B 7/06 (2006.01)
G01B 17/02 (2006.01)

(52) U.S. Cl. .................. 33/555.1; 73/865.8
(58) Field of Classification Search ........... 33/555.1, 33/555.3, 543; 73/865.8, 622, 627, 638, 73/640
See application file for complete search history.

(56) References Cited

U.S. PATENT DOCUMENTS

| | | | |
|---|---|---|---|
| 3,732,726 A | | 5/1973 | Ferber |
| 4,099,418 A | * | 7/1978 | Bennett et al. ............... 73/622 |
| RE30,088 E | * | 9/1979 | Lund et al. .................. 73/622 |
| 4,176,461 A | * | 12/1979 | Gebel et al. ............... 33/555.1 |
| 4,729,174 A | * | 3/1988 | Caron et al. ................ 33/504 |
| 5,379,237 A | * | 1/1995 | Morgan et al. ............... 703/2 |
| 6,889,562 B2 | * | 5/2005 | Gysling et al. ........... 73/861.42 |
| 6,996,913 B2 | * | 2/2006 | Lum et al. ................... 33/550 |
| 7,159,477 B2 | * | 1/2007 | Edwin et al. .............. 73/865.8 |
| 2001/0029989 A1 | | 10/2001 | Paz |
| 2003/0083576 A1 | | 5/2003 | Bazarov et al. |
| 2004/0003637 A1 | * | 1/2004 | Sauerland et al. ........... 72/12.7 |

(Continued)

FOREIGN PATENT DOCUMENTS

CA 2333439 A1 7/2001

(Continued)

OTHER PUBLICATIONS

PCT International Search Report dated Nov. 6, 2008.

*Primary Examiner*—R. A. Smith
(74) *Attorney, Agent, or Firm*—Jpseph J. Christian

(57) ABSTRACT

A method includes measuring a radius of curvature at each of the plurality of positions of the outer peripheral surface of the predetermined section of the pipe is measured through the first device. A second device is detachably coupled to the plurality of positions along the outer peripheral surface of the predetermined section of the pipe. A wall thickness at each of the plurality of positions of the outer peripheral surface of the predetermined section of the pipe is measured through the second device. A cross-sectional area of the predetermined section of the pipe is measured based on a measurement data including the radius of curvature and wall thickness at each of the plurality of positions of the outer peripheral surface of the predetermined section of the pipe.

29 Claims, 3 Drawing Sheets

U.S. PATENT DOCUMENTS

| | | |
|---|---|---|
| 2004/0167735 A1 | 8/2004 | Rothman et al. |
| 2006/0212261 A1 | 9/2006 | Glascock |

FOREIGN PATENT DOCUMENTS

| | | | |
|---|---|---|---|
| DE | 4222611 A1 | | 1/1994 |
| GB | 947450 | | 1/1964 |
| GB | 1247768 | | 9/1971 |
| SU | 690376 A | * | 10/1979 |
| SU | 653801 B | * | 8/1981 |
| SU | 1002819 A | * | 3/1983 |
| WO | WO03076869 A1 | | 9/2003 |

* cited by examiner

SYSTEM AND METHOD FOR MEASURING INSTALLATION DIMENSIONS FOR FLOW MEASUREMENT SYSTEM

BACKGROUND

The invention relates generally to a dimension measurement system, and more particularly to a system and method for measuring installation dimensions for a flow measurement system non-intrusively clamped on a pipe.

Flow measurement is a quantification of bulk fluid or gas movement through a pipe. Flow may be measured in a variety of ways. Flow meters are typically used to measure the flow of fluids through a pipe. Most flow meters are systems having a meter body referred to as "spool", and an electronics data acquisition unit. Flow sensor elements generally embedded in the meter body and electronics provides analog or digital output of data of flow rate. The geometry parameters of the meter body are generally pre-determined. The installation of these types of meters requires flow to be shut down. As a result, the installation becomes expensive and unacceptable in certain cases. In contrast, clamp-on ultrasonic flow meter may be directly clamped on an existing pipe to measure flow rate of the fluid inside the pipe without requiring such expensive installation process. In most of the applications involving installation of the clamp-on flow meters, dimensional data of the pipe is measured prior to installing the flow meters at an installation location. The dimensional data may include diameter, wall thickness, and cross-sectional area at the installation location of the pipe.

Conventionally calipers may be used to measure the diameter of the pipe at various locations along the circumferential direction of the pipe. Ultrasonic thickness measurement systems may be used to measure the wall thickness of the pipe at locations where the diameter is determined. The average diameter and average wall thickness may be used to calculate the cross-sectional area of the "installation location" of the pipe. Installation location may be referred to as the location in which a flow meter is installed for monitoring fluid flow through the pipe. In another example, tapes or other flexible measurement systems may be used to measure the area of the encircled portion of the pipe around which the tape or flexible measurement system is applied. The wall thickness of the particular location may be determined using a conventional ultrasonic thickness measurement system. The wall thickness data is used in combination with data obtained using the flexible tapes to determine the cross-sectional area of the installation location of the pipe. However, such a system described above does not provide accurate measurement data of the installation location of the pipe. Moreover, such a system is not suitable for non-circular applications such as when the pipe has a non-circular cross-section, for example a pipe having a circular cross-sectional area that deformed into an oval shape during manufacturing or installation.

An improved system and method for measuring installation dimensions for a non-intrusive flow measurement system in a pipe is desirable.

BRIEF DESCRIPTION

In accordance with one exemplary embodiment of the invention, an apparatus for measuring one or more installation dimensions of a predetermined section of a pipe configured to accommodate a flow measurement system is disclosed. The apparatus includes a first device configured to be detachably coupled to a plurality of positions measured circumferentially from a datum point along an outer peripheral surface of the predetermined section of the pipe. The first device is configured to measure a radius of curvature at each of the plurality of positions of the outer peripheral surface of the predetermined section of the pipe. A second device is configured to be detachably coupled to the plurality of positions along the outer peripheral surface of the predetermined section of the pipe. The second device is configured to measure a wall thickness along the plurality of positions of the outer peripheral surface of the predetermined section of the pipe. A processor is configured to receive measurement data including the radius of curvature and wall thickness along the plurality of positions of the outer peripheral surface of the predetermined section of the pipe. The processor is configured to determine shape of the inner and outer cross-section of the predetermined section of the pipe based on the measurement data.

In accordance with another embodiment of the invention, a method for determining cross-sectional area of a predetermined section of a pipe is disclosed. The method includes successively coupling a first device to a plurality of positions measured circumferentially from a datum point along an outer peripheral surface of a predetermined section of a pipe. A radius of curvature at each of the plurality of positions of the outer peripheral surface of the predetermined section of the pipe is measured through the first device. A second device is coupled to the plurality of positions along the outer peripheral surface of the predetermined section of the pipe. A wall thickness at each of the plurality of positions of the outer peripheral surface of the predetermined section of the pipe is measured through the second device. A cross-sectional area of the predetermined section of the pipe is measured based on a measurement data including the radius of curvature and wall thickness at each of the plurality of positions of the outer peripheral surface of the predetermined section of the pipe.

These and other advantages and features will be more readily understood from the following detailed description of preferred embodiments of the invention that is provided in connection with the accompanying drawings.

DRAWINGS

DETAILED DESCRIPTION

As discussed in detail below, embodiments of the invention provide an apparatus for measuring one or more installation dimensions of a predetermined section of a pipe configured to accommodate a flow measurement system. A first device is configured to measure a radius of curvature at each of a plurality of positions measured circumferentially from a datum point along an outer peripheral surface of a predetermined section of a pipe. A second device is configured to measure a wall thickness at each of a plurality of positions along an outer peripheral surface of a predetermined section of a pipe. A processor is configured to determine a cross-sectional area of the predetermined section of the predetermined section of the pipe based on data including the radius of curvature and wall thickness. In another exemplary embodiment, a method for determining one or more installation dimensions of a predetermined section of a pipe configured to accommodate a flow measurement system is disclosed. The exemplary system described herein provides an accurate measurement data of the installation location of the pipe. Moreover, such a system is also suitable for non-circular applications such as when the pipe has a non-circular cross-section, for example a pipe having an oval cross-sectional area due to deformation during manufacturing or installation.

Figure 1:
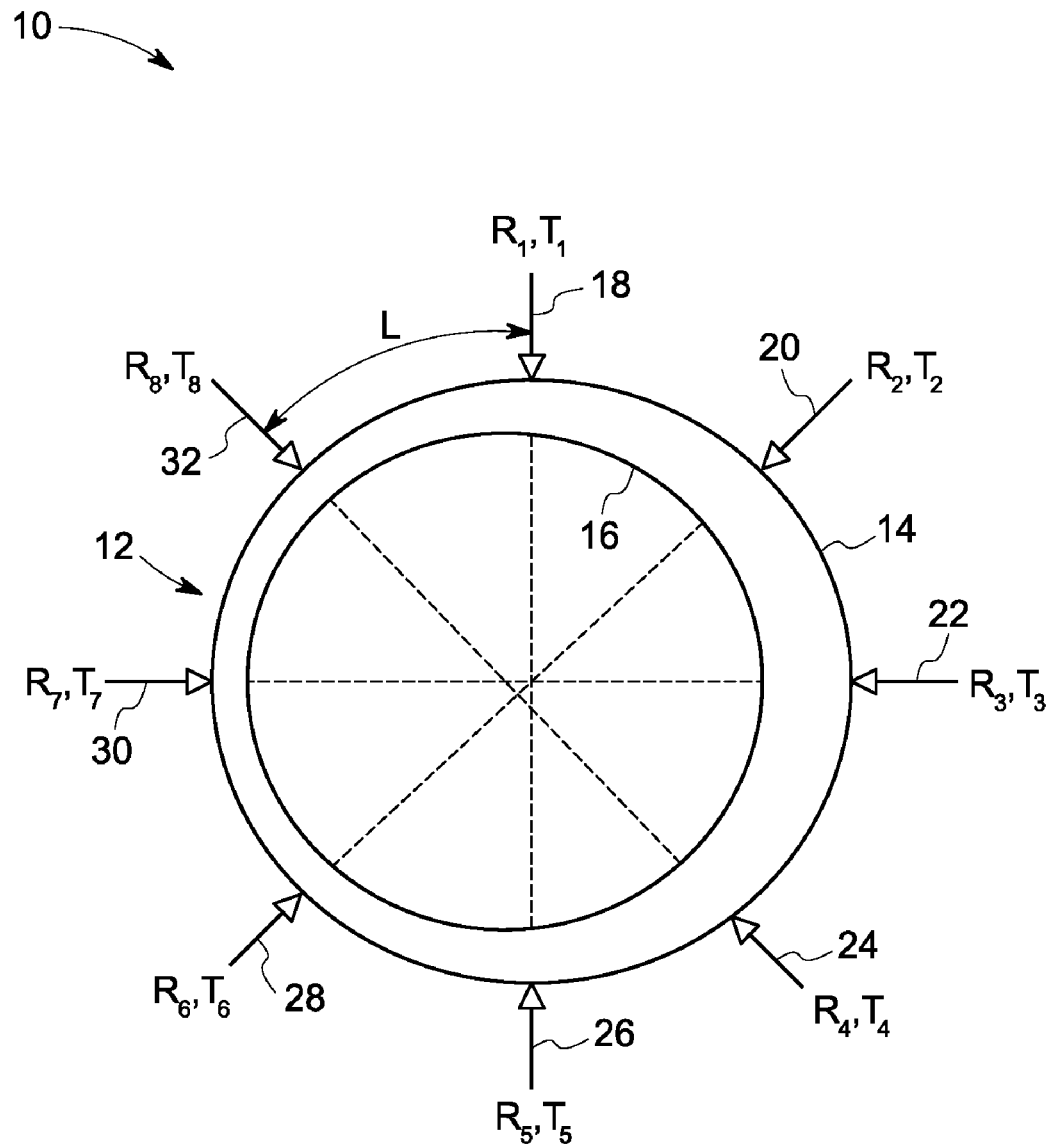
FIG. 1 is a diagrammatical representation of a pipe having an oval cross-section along which one or more installation dimensions are measured for installation of a flow measurement system in accordance with an exemplary embodiment of the invention.

Referring to FIG. 1, a pipe 10 having a predetermined section 12 along which one or more installation dimensions are measured for installation of a flow measurement system is illustrated. The predetermined section 12 of the pipe 10 has an oval cross-section. The predetermined section 12 of the pipe 10 has an outer peripheral surface 14 and an inner peripheral surface 16. In the illustrated embodiment, distance between the outer peripheral surface 14 and the inner peripheral surface 16 varies. In other words, the inner peripheral surface 16 is not concentric to the outer peripheral surface 14.

A plurality of positions 18, 20, 22, 24, 26, 28, 30 and 32 is marked along the outer peripheral surface 14 of the predetermined section 12 of the pipe 10. In the illustrated embodiment, eight positions are marked along the outer peripheral surface 14 of the predetermined section 12 of the pipe 10. Each position is spaced apart from the mutually adjacent position by a distance "L," i.e., the positions are evenly spaced apart. In some other exemplary embodiments, spacing between the positions may vary. Any measuring devices or instruments known to those skilled in the art may be used to mark the plurality of positions 18 along the outer peripheral surface 14. It should be noted herein that the number of positions may be varied depending upon the application.

The exemplary technique described herein facilitates a more accurate measurement of one or more installation dimensions of the predetermined section of the pipe. The accuracy of flow measurement through the pipe 10 using a flow meter is dependent upon the precise determination of the installation dimensions of the predetermined section of the pipe. A volumetric flow (Q) through the predetermined section of the pipe 10 is determined based on the following relation:

$$Q \propto \frac{K \times S \times C^2 \times \Delta T}{2 \times L}$$

where K is the profile factor, S is the cross-sectional area of the predetermined section 12 of the pipe 10, C is the speed of sound in fluid, L is the distance between the positions, and $\Delta T$ is the time measurement.

In the illustrated embodiment, a radius of curvature and a wall thickness are measured at each of the plurality of positions along the outer peripheral surface 14. For example, at position 18, a radius of curvature is represented by $R_1$ and thickness is represented by $T_1$. Similarly the radius of curvature and thickness measurement at positions 20, 22, 24, 26, 28, 30 and 32 are represented by, respectively, $R_2T_2$, $R_3T_3$, $R_4T_4$, $R_5T_5$, $R_6T_6$, $R_7T_7$, and $R_8T_8$. In the illustrated embodiment, the position 18 may be referred to as a datum point.

Each of the subsequent positions 20, 22, 24, 26 28, 30, and 32 are marked by measuring circumferentially with reference to the datum point 18. In certain other exemplary embodiments, the datum point may be varied depending on the application. A cross-sectional area of the predetermined section 12 of the pipe 10 is determined using computational algorithms based on measurement data including the measured radius of curvature and wall thickness at each of the plurality of positions along the outer peripheral surface 14. In some exemplary embodiments, one or more installation dimensions including cross-sectional area, wall thickness, diameter or combinations thereof of the predetermined section 12 of the pipe may be determined. In the conventional technique, the diameter and wall thickness of the pipe at various locations along the circumferential direction of the pipe is measured. The average diameter and average wall thickness data are used to calculate the cross-sectional area of the installation location of the pipe. However, the conventional technique is not suitable for non-circular applications such as when the pipe has a non-circular cross-section, for example a pipe having an oval cross-sectional area. The measurement errors may be induced due to a variety of factors such as non-circular profile of the pipe, and also errors in the measuring device due to factors such as resolution, reproducibility, repeatability, or the like. Errors may also arise due to improper access to the installation site of the pipe. The technique in accordance with an exemplary embodiment of the invention directly measures the radius of curvature and also the wall thickness at each of the plurality of positions along the outer peripheral surface of the predetermined section 12 of the pipe 10. The exemplary technique provides an accurate dimensional assessment of one or more installation dimensions of the predetermined section 12 of pipe 10 in which the flow meter is to be installed for flow measurement in the pipe 10.

Figure 2:
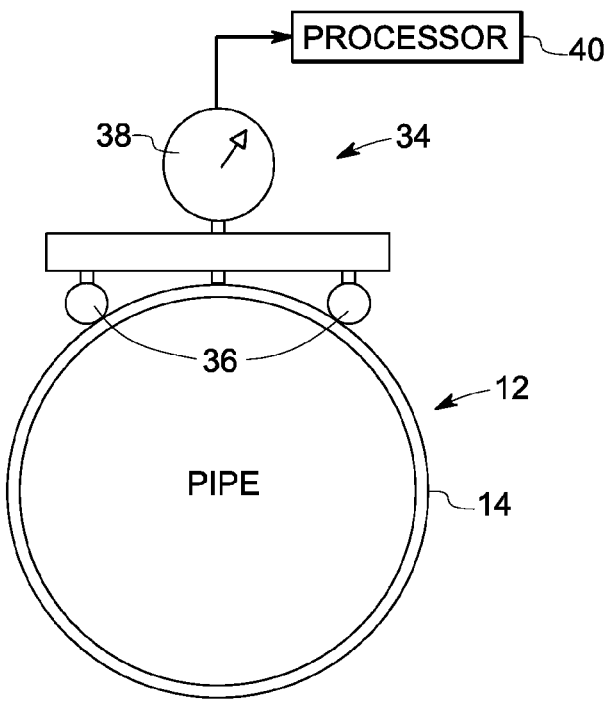
FIG. 2 is a diagrammatical representation of a device configured to measure a radius of curvature of a predetermined section of a pipe in accordance with the aspects of FIG. 1.

Referring to FIG. 2, a first device 34 configured to measure a radius of curvature of the predetermined section 12 of the pipe 10 in accordance with aspects of FIG. 1 is illustrated. In the illustrated embodiment, the first device 34 includes a plurality of leg portions 36 spaced apart from each other and configured to contact the outer peripheral surface 14 of the predetermined section 12 of the pipe. The number of leg portions 36 may include two or more leg portions. A dial indicator 38 is provided between the leg portions 36. The dial indicator 38 is configured to provide indication of radius of curvature at each of the plurality of positions measured circumferentially from a datum point along the outer peripheral surface 14. In one exemplary embodiment, the dial indicator 38 may include a linear variable differential transformer (LVDT). In another exemplary embodiment, the dial indicator 38 may include a digital dial indicator. With reference to both FIGS. 1 and 2, for example, the first device 34 may be positioned initially at position 18 and is used to measure the radius of curvature ($R_1$) at the position 18. In other words, dial deflection relative to flat surface deflection is noted. The first device 34 may then be moved along the clockwise direction and placed successively at positions 20, 22, 24, 26, 28, 30, and 32 and used to measure radius of curvature $R_2$, $R_3$, $R_4$, $R_5$, $R_6$, $R_7$, $R_8$. It should be noted herein that the starting point and direction of movement for measurement may be varied depending upon the requirement. The radius of curvature data pertaining to the plurality of positions may be transmitted to a processor 40 for subsequent calculations for determining the cross-sectional area of the predetermined section 12 of the pipe 10.

Figure 3:
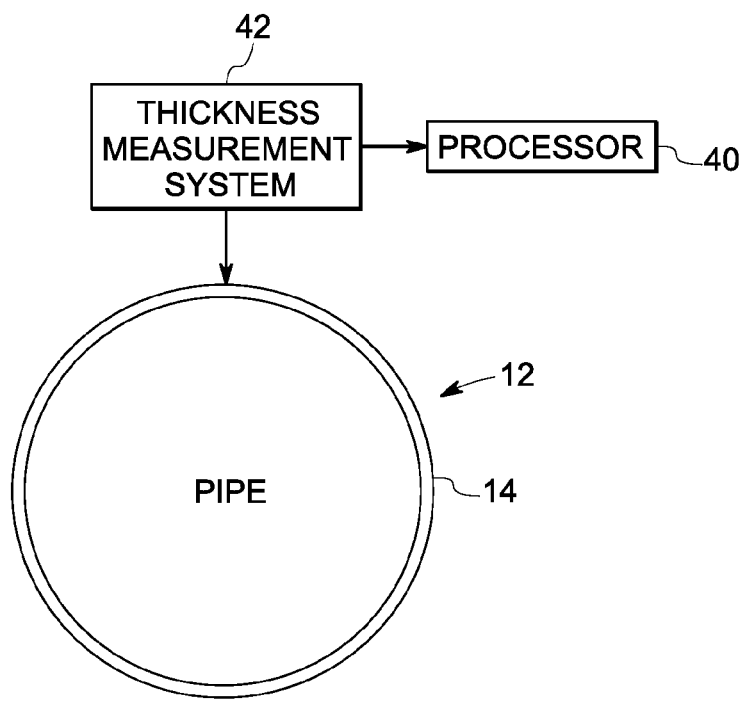
FIG. 3 is a diagrammatical representation of a device configured to measure a wall thickness of a predetermined section of a pipe in accordance with the aspects of FIG. 1.

Referring to FIG. 3, a second device 42 configured to measure a wall thickness of the predetermined section 12 of the pipe 10 in accordance with aspects of FIG. 1 is illustrated.

In the illustrated embodiment, the second device 42 is detachably coupled to each of the plurality of positions measured circumferentially from a datum point along the outer peripheral surface 14 of the predetermined section 12 of the pipe 10. The second device 42 is configured to measure a wall thickness at each of the plurality of positions along the outer peripheral surface 14 of the predetermined section 12 of the pipe 10. In one exemplary embodiment, the second device 42 includes an ultrasonic based thickness measurement system. For example, an ultrasonic based thickness measurement system may utilize a transmitter transducer to direct pulses of ultrasonic energy into the outer peripheral wall of the predetermined section 12 of the pipe 10 and may employ a receiver transducer to receive pulses reflected from the outer peripheral surface of the predetermined section 12 of the pipe 10. Timing measurements for determining the thickness of the wall may be made with reference to the occurrence of a clock pulse from a clock pulse source, which also actuates the transmitter transducer. In another exemplary embodiment, the ultrasonic based thickness measurement system may utilize a single probe to direct pulses of ultrasonic energy into the outer peripheral wall of the predetermined section 12 of the pipe 10 and receive pulses reflected from the outer peripheral surface of the predetermined section 12 of the pipe 10. In another exemplary embodiment, the second device 42 includes an eddy current based thickness measurement system. In another exemplary embodiment, the second device 42 includes an X-ray based thickness measurement system. It should be noted any type thickness measurement system known to those skilled in the art may be envisaged.

In certain exemplary embodiments, the first device 34 illustrated in FIG. 2 and the second device illustrated in FIG. 3 may be a single incorporated in a single unit. The single unit may then be used to measure both radius of curvature and a wall thickness at each of the plurality of positions of the outer peripheral surface of the predetermined section of the pipe. For example, the ultrasonic or eddy current based thickness measurement system used to measure the pipe thickness may be part of the system used to measure the radius of curvature. In another example, a tip of the LVDT or dial indicator may be used as an ultrasonic/eddy current probe to measure the wall thickness. In such systems, both radius of curvature and wall thickness may be simultaneously measured.

With reference to both FIGS. 1 and 2, for example, the second device 42 may be positioned initially at position 18 and be used to measure the wall thickness ($T_1$) at the position 18. The first device 42 may then be moved along the clockwise direction and placed successively at positions 20, 22, 24, 26, 28, 30, and 32 and used to measure the wall thickness $T_2$, $T_3$, $T_4$, $T_5$, $T_6$, $T_7$, and $T_8$. It should be noted herein again that the starting point and direction of movement for measurement may be varied depending upon the requirement. The radius of curvature data pertaining to the plurality of positions may be transmitted to the processor 40 for subsequent calculations for determining the cross-sectional area of the predetermined section 12 of the pipe 10. The radius of curvature data and wall thickness data are measured to obtain a cross-sectional area of the predetermined section 12 of the pipe 10.

Figure 4:
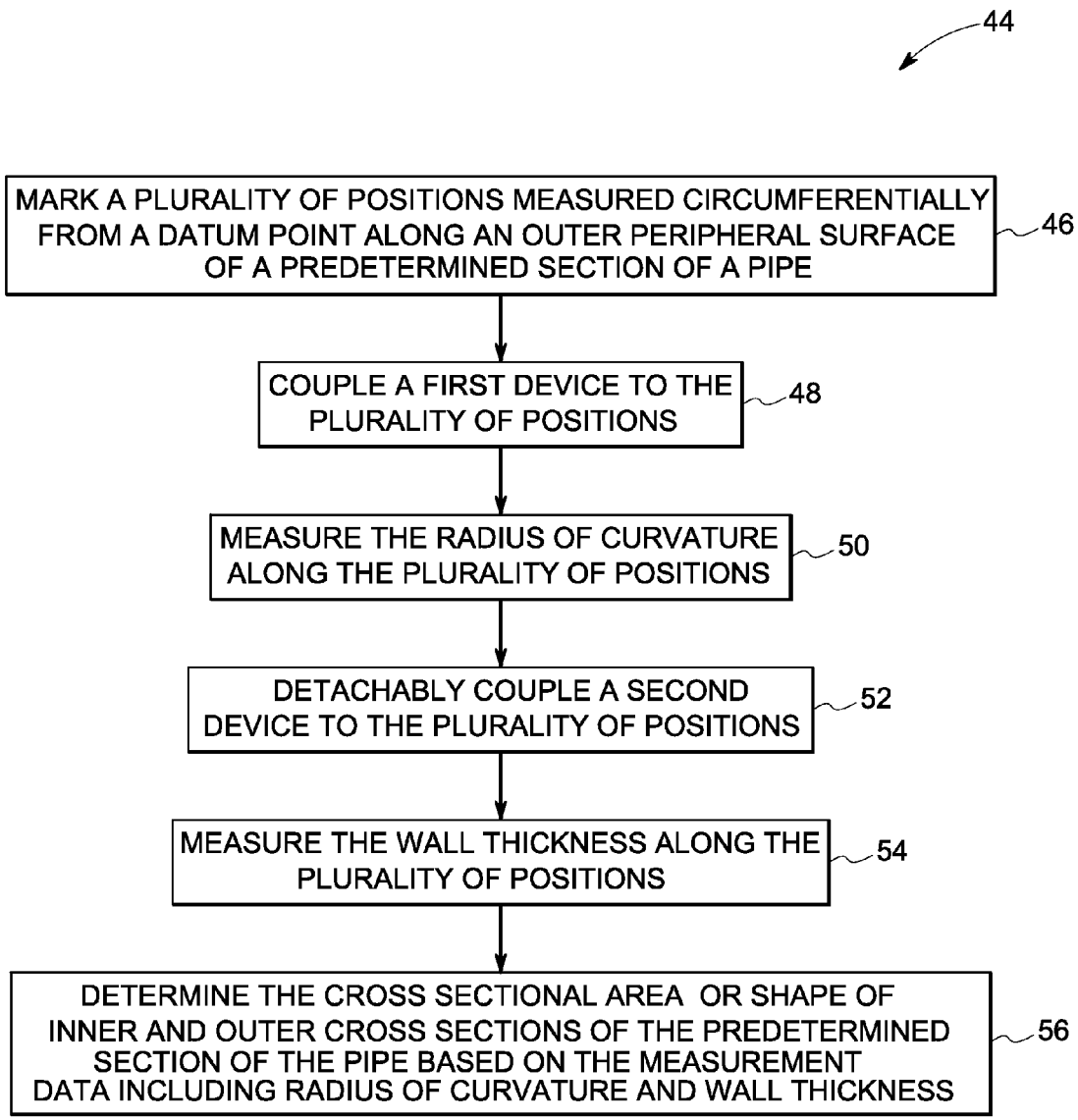
FIG. 4 is a flow chart illustrating process steps for measuring one or more installation dimensions of a predetermined section of a pipe configured to accommodate a flow measurement system in accordance with an exemplary embodiment of the invention.

Referring to FIG. 4, a flow chart 44 illustrating process steps for measuring one or more installation dimensions of a predetermined section 12 of a 10 pipe configured to accommodate a flow measurement system in accordance with an exemplary embodiment of the invention is illustrated. The flow chart 44 includes marking a plurality of positions measured circumferentially from a datum point along an outer peripheral surface 14 of the predetermined section 12 of the pipe 10 using a measuring device as represented by the step 46. In one example, eight positions may be marked along the outer peripheral surface of the predetermined section 12 of the pipe 10. In another example, twelve positions may be marked along the outer peripheral surface 14 of the predetermined section 12 of the pipe 10. The number of positions and spacing between the positions may be varied depending upon the application. A first device 34 is coupled to each of the plurality of positions along the outer peripheral surface as represented by the step 48. The first device 34 is used to measure a radius of curvature at each of the plurality of positions along the outer peripheral surface 14 as represented by the step 50. The radius of curvature data is then transmitted to a processor for further computational operations.

A second device 42 is coupled to each of the plurality of positions along the outer peripheral surface 14 as represented by the step 52. The second device 42 is used to measure a wall thickness at each of the plurality of positions along the outer peripheral surface 14 as represented by the step 54. The wall thickness data is then transmitted to the processor for further computational operations. The processor 40 computes a cross-sectional area of the predetermined section 12 of the pipe 10 based on data including the radius of curvature and wall thickness as represented by the step 56. In some exemplary embodiments, one or more installation dimensions including cross-sectional area, wall thickness, diameter or combinations thereof of the predetermined section 12 of the pipe 10 may be determined. The exemplary technique may be used when a system is used a flow meter within a pipe 10 or for periodic calibration of the installation section of the pipe 10. In accordance with another exemplary embodiment; output of the processor 40 may include shape of the inner and outer cross-sections of the pipe 10 at predetermined locations of the pipe.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An apparatus for measuring one or more installation dimensions of a predetermined section of a non-circular pipe configured to accommodate a flow measurement system, the apparatus comprising:
    a first device configured to be detachably coupled to a plurality of positions measured circumferentially from a datum point along an outer peripheral surface of the predetermined section of the pipe and configured to measure a radius of curvature at each of the plurality of positions of the outer peripheral surface of the predetermined section of the pipe;
    a second device configured to be detachably coupled to the plurality of positions along the outer peripheral surface of the predetermined section of the pipe and configured to measure a wall thickness along the plurality of positions of the outer peripheral surface of the predetermined section of the pipe; and
    a processor configured to receive measurement data comprising the radius of curvature and wall thickness along the plurality of positions of the outer peripheral surface of the predetermined section of the pipe, wherein the processor is configured to determine a cross-sectional area of the predetermined section of the pipe based on the measurement data.

2. The apparatus of claim 1, wherein the first device comprises a plurality of leg portions spaced apart from each other and configured to contact the outer peripheral surface of the predetermined section of the pipe.

3. The apparatus of claim 2, wherein the first device comprises a dial indicator provided between the plurality of leg portions and configured to indicate the radius of curvature along the plurality of positions of the outer peripheral surface of the predetermined section of the pipe.

4. The apparatus of claim 3, wherein the dial indicator comprises a linear variable differential transformer or digital dial indicator.

5. The apparatus of claim 1, wherein the second device comprises an ultrasonic based thickness measurement system.

6. The apparatus of claim 1, wherein the second device comprises an eddy current based thickness measurement system.

7. The apparatus of claim 1, wherein the second device comprises an X-ray based thickness measurement system.

8. The apparatus of claim 1, wherein the one or more installation dimensions comprises cross-sectional area, or wall thickness, or diameter of the predetermined section of the pipe.

9. The apparatus of claim 1, wherein the apparatus is configured for measuring one or more installation dimensions of a predetermined section of a pipe having an oval cross-section.

10. The apparatus of claim 1, wherein the plurality of positions comprises three or more positions along the outer peripheral surface of the predetermined section of the pipe.

11. A method comprising:
successively coupling a first device to a plurality of positions measured circumferentially from a datum point along an outer peripheral surface of a predetermined section of a non-circular pipe;
measuring a radius of curvature at each of the plurality of positions of the outer peripheral surface of the predetermined section of the pipe through the first device;
detachably coupling a second device to the plurality of positions along the outer peripheral surface of the predetermined section of the pipe;
measuring a wall thickness at each of the plurality of positions of the outer peripheral surface of the predetermined section of the pipe through the second device; and
determining a cross-sectional area of the predetermined section of the pipe based on a measurement data comprising the radius of curvature and wall thickness at each of the plurality of positions of the outer peripheral surface of the predetermined section of the pipe.

12. The method of claim 11, comprising contacting a plurality of leg portions of the first device against the outer peripheral surface of the predetermined section of the pipe.

13. The method of claim 12, comprising measuring the radius of curvature along the plurality of positions of the outer peripheral surface of the predetermined section of the pipe using a dial indicator of the first device.

14. The method of claim 13, comprising measuring the radius of curvature along the plurality of positions of the outer peripheral surface of the predetermined section of the pipe using a linear variable differential transformer, or digital dial indicator.

15. The method of claim 11, comprising measuring the wall thickness using an ultrasonic based thickness measurement system.

16. The method of claim 11, comprising measuring the wall thickness using an eddy current based thickness measurement system.

17. The method of claim 11, comprising measuring the wall thickness using an X-ray based thickness measurement system.

18. The method of claim 11, comprising determining cross-sectional area, or wall thickness, or diameter, or combinations thereof of the predetermined section of the pipe.

19. The method of claim 11, wherein the plurality of positions comprises three or more positions along the outer peripheral surface of the predetermined section of the pipe.

20. An apparatus for measuring one or more installation dimensions of a predetermined section of a non-circular pipe configured to accommodate a flow measurement system, the apparatus comprising:
a device configured to be detachably coupled to a plurality of positions measured circumferentially from a datum point along an outer peripheral surface of the predetermined section of the pipe and configured to measure a radius of curvature and a wall thickness at each of the plurality of positions of the outer peripheral surface of the predetermined section of the pipe; and
a processor configured to receive measurement data comprising the radius of curvature and wall thickness along the plurality of positions of the outer peripheral surface of the predetermined section of the pipe, wherein the processor is configured to determine a cross-sectional area of the predetermined section of the pipe based on the measurement data.

21. The apparatus of claim 20, further comprising a measuring device configured to mark the plurality of positions.

22. The apparatus of claim 20, wherein the device comprises a plurality of leg portions spaced apart from each other and configured to contact the outer peripheral surface of the predetermined section of the pipe.

23. The apparatus of claim 22, wherein the device comprises a dial indicator provided between the plurality of leg portions and configured to indicate the radius of curvature along the plurality of positions of the outer peripheral surface of the predetermined section of the pipe.

24. The apparatus of claim 23, wherein the dial indicator comprises a linear variable differential transformer or digital dial indicator.

25. The apparatus of claim 20, wherein the device comprises an ultrasonic based thickness measurement system.

26. The apparatus of claim 20, wherein the device comprises an eddy current based thickness measurement system.

27. The apparatus of claim 20, wherein the one or more installation dimensions comprises cross-sectional area, or wall thickness, or diameter of the predetermined section of the pipe.

28. The apparatus of claim 20, wherein the apparatus is configured for measuring one or more installation dimensions of a predetermined section of a pipe having an oval cross-section.

29. The apparatus of claim 20, wherein the plurality of positions comprises three or more positions along the outer peripheral surface of the predetermined section of the pipe.

* * * * *